United States Patent
Takada et al.

(10) Patent No.: US 6,935,732 B2
(45) Date of Patent: Aug. 30, 2005

(54) REACTION SOLUTION, SET OF REACTION SOLUTION AND INK, INKJET RECORDING APPARATUS AND IMAGE RECORDING METHOD

(75) Inventors: Yoichi Takada, Kanagawa (JP); Shinya Mishina, Kanagawa (JP); Shinichi Hakamada, Kanagawa (JP); Noriyasu Asaki, Kanagawa (JP); Yasuhiro Nito, Kanagawa (JP); Masashi Tsujimura, Kanagawa (JP); Takashi Imai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/662,282

(22) Filed: Sep. 16, 2003

(65) Prior Publication Data

US 2004/0119800 A1 Jun. 24, 2004

(30) Foreign Application Priority Data

Sep. 17, 2002 (JP) .......................... 2002-270741
Sep. 12, 2003 (JP) .......................... 2003-321449

(51) Int. Cl.$^7$ ................................. B41J 2/01
(52) U.S. Cl. ..................... 347/96; 347/100; 347/95; 106/31.13
(58) Field of Search ................. 347/95, 96, 100, 347/101, 98; 106/31.13, 31.6, 31.27; 523/160

(56) References Cited

U.S. PATENT DOCUMENTS

| | | | |
|---|---|---|---|
| 5,695,820 A | * | 12/1997 | Davis et al. ................. 347/100 |
| 5,734,403 A | | 3/1998 | Suga et al. ................. 347/101 |
| 5,792,249 A | * | 8/1998 | Shirota et al. .............. 347/100 |
| 6,020,397 A | * | 2/2000 | Matzinger .................... 523/160 |
| 6,027,210 A | | 2/2000 | Kurabayashi et al. ........ 347/100 |
| 6,084,619 A | | 7/2000 | Takemoto et al. ............. 347/96 |
| 6,238,045 B1 | | 5/2001 | Ono et al. ..................... 347/96 |
| 6,280,513 B1 | * | 8/2001 | Osumi et al. ............... 106/31.6 |
| 6,341,854 B1 | * | 1/2002 | Takemoto ..................... 347/96 |
| 6,435,658 B1 | | 8/2002 | Kato et al. ..................... 347/43 |
| 6,506,239 B1 | | 1/2003 | Osumi et al. ............. 106/31.27 |
| 6,538,047 B1 | * | 3/2003 | Miyabayashi ................. 347/96 |
| 6,572,692 B1 | | 6/2003 | Osumi et al. ............... 106/31.6 |
| 6,582,070 B2 | | 6/2003 | Takada et al. .............. 347/100 |
| 2003/0064206 A1 | * | 4/2003 | Koyano et al. ............. 428/195 |

FOREIGN PATENT DOCUMENTS

| | | | |
|---|---|---|---|
| EP | 0 739 743 A1 | 10/1996 | |
| EP | 739743 A1 | * 10/1996 | .............. B41J/2/21 |
| JP | 6-106735 A | 4/1994 | |
| JP | 9-207424 A | 8/1997 | |
| JP | 2000-37942 A | 2/2000 | |
| JP | 2000-94825 A | 4/2000 | |
| JP | 2002-079739 | * 3/2002 | .............. B41J/2/01 |

* cited by examiner

Primary Examiner—Manish S. Shah
(74) Attorney, Agent, or Firm—Fitzpatrick, Cella, Harper & Scinto (57) ABSTRACT

A reaction solution that is used for image recording with an ink containing a coloring material in a dissolved or dispersed state to destabilize the dissolved or dispersed state of the coloring material in the ink in contact with the ink to provide high quality and abrasion-resistant images, wherein the reaction solution contains at least a polyvalent metal ion and a nonionic polymer, the Ka value according to the Bristow method is from 1.3 mL·m$^{-2}$·msec$^{-1/2}$ to 3.0 mL·m$^{-2}$·msec$^{-1/2}$ inclusive, and the viscosity is from 20 mPa·s to 150 mPa·s inclusive.

18 Claims, 4 Drawing Sheets

REACTION SOLUTION, SET OF REACTION SOLUTION AND INK, INKJET RECORDING APPARATUS AND IMAGE RECORDING METHOD

BACKGROUND OF THE INVENTION

1. Field of the Invention

The present invention relates to a reaction solution, a set of the reaction solution and an ink, an inkjet recording apparatus and an image recording method, and particularly relates to a reaction solution to be used with an ink when printing is performed on a recording medium, a set of a reaction solution and an ink, and an image recording method using the same.

2. Related Background Art

The inkjet recording method is a method of printing that can achieve printing of high resolution and high quality images at high speed using an inexpensive apparatus, where ink droplets are ejected and attached on a recording medium such as paper.

Japanese Patent Application Laid-Open No. H06-106735A discloses technical means to obtain color images of high quality, high image density and free from color bleed, by using a black ink that thickens or agglomerates reacting with a salt, and a color ink containing the salt. That is, a good image can be obtained by using two liquids in printing: a solution containing a salt and an ink composition reactive with the solution.

Various proposals for using two liquids have been made, for example, in Japanese Patent Application Laid-Open Nos. H09-207424A, 2000-37942A and the like.

Furthermore, Japanese Patent Application Laid-Open No. 2000-94825A discloses use of a polyvalent metal salt and a nonionic resin to thicken the solution containing the polyvalent metal salt so as to fix a coloring material on the surface of paper.

The inventors of the present invention studied ink sets containing polyvalent metal ions to obtain high quality color image of high image density and free from color bleed, and completed the recording method as disclosed in Japanese Patent Application Laid-Open No. H06-106735A, etc. They, however, recognized new problems due to the high reactivity.

Specifically, because of the high reactivity, the reaction is almost completed at the time when a liquid composition and an ink composition come in contact with each other (within about several hundreds msec). Consequently, coloring material components that have reacted with the liquid composition remain on the recording medium which may lead to falling off of the recorded region with rubbing (rub-off), not desirable for both side printing. To solve this problem, a nonionic resin was added to a solution containing a polyvalent metal in Japanese Patent Application Laid-Open No. 2000-94825A, to fix coloring materials on the surface of paper so as to prevent the rub-off problem of the recorded area effectively.

However, when normal paper is coated with a solution containing a polyvalent metal and a nonionic resin by roller coating, uniform coating is difficult because of the low penetrability of the solution into the paper, which may cause unevenness in image density of the recorded image. Readily conceivable means to solve this problem of uneven image density, might be to increase the application amount of the liquid composition, or to increase the coating pressure by controlling the pressure of the coating roller.

However, if a large amount of a solution is applied, the period for drying the printed matter becomes long, and delayed fixation tends to cause smear when the recorded area is rubbed. In addition, the surface of the paper tends to crease because a large amount of solution is applied on the recording medium. Therefore this method is not preferred. On the other hand, if the pressure of the roller is adjusted to increase the coating pressure, a problem arises such that the apparatus becomes complicated to cope with normal paper of different thicknesses, and therefore this method is not preferred like the above method.

SUMMARY OF THE INVENTION

Thus, the object of the present invention is to provide a reaction solution, a set of a reaction solution and an ink, an inkjet recording apparatus and an image recording method, with which when a liquid composition is applied onto normal paper by roller coating, a high quality color image having a high image density, free from uneven image density, color bleed and rub-off can be obtained, and the recording apparatus is not complicated.

On the basis of the above-described findings, the inventors carried out intensive study to achieve the above object, that is, to apply a certain amount of a reaction solution uniformly on a recording medium by roller coating. As a result, the present invention was completed as described below.

An aspect of the present invention is a reaction solution for use in image recording in conjunction with an ink containing a coloring material in a dissolved or dispersed state, the reaction solution destabilizing the dissolved or dispersed state of the coloring material in the ink in contact with the ink, wherein the reaction solution contains at least a polyvalent metal ion and a nonionic polymer, Ka value of the reaction solution according to the Bristow method is from 1.3 $mL \cdot m^{-2} \cdot msec^{-1/2}$ to 3.0 $mL \cdot m^{-2} \cdot msec^{-1/2}$ inclusive, and viscosity of the reaction solution is from 20 mPa·s to 150 mPa·s inclusive.

Another aspect of the present invention is a set of an ink and a reaction solution as described above.

Still another aspect of the present invention is an inkjet recording apparatus comprising a recording head for discharging an ink, an ink cartridge having an ink storage unit containing the ink, ink supply means for supplying the ink from the ink cartridge to the recording head, and means for supplying a reaction solution, wherein the ink and the reaction solution are as described above.

Still another aspect of the present invention is an image recording method comprising the steps of:

coating a recording medium with a reaction solution; and coating an ink on the recording medium by an inkjet method, wherein the reaction solution and the ink are as described above.

DETAILED DESCRIPTION OF THE INVENTION

The reaction solution of the present invention contains at least a polyvalent metal and a nonionic polymer, wherein the Ka value of the reaction solution according to the Bristow method is 1.3 mL·m$^{-2}$·msec$^{-1/2}$ to 3.0 mL·m$^{-2}$·msec$^{-1/2}$, and the viscosity of the reaction solution is 20 mPa·s to 150 mPa·s.

The present invention will be described more in detail below with preferred embodiments.

<Reaction Solution>

The reaction solution according to the present invention is used in image recording with an ink containing a coloring material in a dissolved or dispersed state, and has a function of destabilizing the dissolved or dispersed state of the coloring material in the ink. The destabilization of the dissolved or dispersed state of the coloring material in the ink in the present invention means that when the ink and the reaction solution are mixed together, agglomeration or gelation of the coloring material is induced in the mixture (may be hereinafter referred to as "destabilization of ink" or "ink destabilization"). In the present invention, polyvalent metal ions are incorporated in the reaction solution to destabilize the ink.

In addition, in the present invention, a nonionic polymer is used as a binder resin for improving the binding between coloring material agglomerates and the surface of a recording medium such as paper and the binding between coloring material agglomerates in order to improve rub-off resistance.

Furthermore, in the present invention, by controlling the Ka value and viscosity of the reaction solution within a certain range as described above, not only a high quality color image having a high image density free from uneven image density and color bleed can be obtained, but also a recorded image having rub-off resistance.

If the Ka value is less than 1.3 mL·m$^{-2}$·msec$^{-1/2}$, the reaction solution is not applied uniformly on the recording medium, resulting in uneven image density, and if the Ka value is greater than 3.0 mL·m$^{-2}$·msec$^{-1/2}$, polyvalent metal ions in the reaction solution will penetrate into the paper excessively, and therefore a high density and high quality image cannot be obtained, and thus the effect of the present invention is not exhibited. The Ka value is more preferably 2.0 mL·m$^{-2}$·msec$^{-1/2}$ to 3.0 mL·m$^{-2}$·msec$^{-1/2}$.

If the viscosity is less than 20 mPa·s, a sufficient amount of the reaction solution cannot be applied onto the recording medium, resulting in uneven image density. If the viscosity is greater than 150 mPa·s, an excessive amount of the reaction solution tends to be applied onto the recording medium, and even if coating conditions are adjusted to reduce the coating amount, it is still difficult to coat the recording medium with the reaction solution uniformly, and an image will suffer from rub-off especially where a large amount of the solution was deposited. The viscosity is preferably 30 mPa·s to 100 mPa·s.

The Ka value in the present invention is determined by the Bristow method as a measure indicating permeability of a solution into a recording medium. When the penetrability of a solution is expressed by the amount V per m$^2$ of a recording medium, the penetration amount V (ml/m$^2$=μm) of the solution into a recording medium after a predetermined time t from the application of the solution is expressed by the Bristow equation:

$$V = Vr + Ka(t-tw)^{1/2},$$

where tw is a contact time and Vr is an amount of the solution absorbed into the rough portion of the recording medium (t>tw).

Immediately after the application of the solution to the surface of the recording medium, almost all solution is absorbed in the rough portion of the recording medium (uneven surface portion of the recording medium) and nearly no solution has penetrated inside the recording medium. This period is defined as the contact time (tw) and the amount of the solution absorbed in the rough portion during the contact time is defined as Vr. After the contact time, the amount of the solution (V) penetrating into the recording medium increases in proportion to ½ power of the elapsed time exceeding the contact time, i.e., (t−tw). Ka is a proportional coefficient of this increment and corresponds to the penetration rate.

The Ka value can be determined by using a test device on dynamic penetrability of liquid by the Bristow method (e.g., Dynamic Penetrability Testing Device S, trade name, a product of TOYO Seiki Mfg., Ltd.).

In the present invention, Ka value by the Bristow method is determined using a normal paper (e.g. PB paper that is used for copiers using the electrophotographic system, page printers (laser beam printers) and printers using the inkjet recording system, manufactured by Canon Inc., PPC paper for copiers using the electrophotographic system, etc.) as the recording medium. The measurement environment is a normal office environment, temperature of 20 to 25° C. and humidity of 40 to 60%.

Viscosity in the present invention may be measured by a conventional method at 25° C.

<Polyvalent Metal Ions>

Preferable polyvalent metal ions that may be used in the reaction solution according to the present invention include, but are not limited to, bivalent metal ions such as $Ca^{2+}$, $Cu^{2+}$, $Ni^{2+}$, $Mg^{2+}$, $ZN^{2+}$, $Sr^{2+}$ and $Ba^{2+}$, and trivalent metal ions such as $Al^{3+}$, $Fe^{3+}$, $Cr^{3+}$ and $Y^{3+}$, for example. Polyvalent metal ion is added in the reaction solution as a salt of a polyvalent metal. Such a salt is a water soluble metal salt comprising a polyvalent metal ion described above and a counteranion of the polyvalent metal ion. Preferable anions for forming salts include, but are not limited to, $Cl^-$, $NO_3^-$, $I^-$, $Br^-$, $ClO_3^-$, $SO_4^{2-}$, $CO_3^{2-}$, $CH_3COO^-$ and $HCOO^-$, for example.

In the present invention, $Ca^{2+}$, $Mg^{2+}$, $Sr^{2+}$, $Al^{3+}$ and $Y^{3+}$ are especially preferable, and $Ca^{2+}$ is more preferable for the polyvalent metal ions in terms of reactivity, coloring characteristics, easiness of handling and the like. In addition, as an anion, $NO_3^-$ is especially preferable in terms of solubility and the like.

The content of polyvalent metal salt in the present invention is preferably not less than 0.01% and not higher than 20% by weight based on the total amount of reaction solution in view of the effect of the present invention. For full exhibition of ink-destabilizing function, it is preferable that the reaction solution contains 0.01% or more of polyvalent metal salt. On the other hand, the content of the polyvalent metal salt in the reaction solution can be more than 20%. This, however, is not so preferable because the amount of material having a buffering action should be increased, and much improvement in the ink-destabilizing function is not expected with the content of polyvalent metal salt exceeding 20%. The content of polyvalent metal ion is preferably in the range of 0.01% to 10% by weight based on the total amount of reaction solution.

<Binder Resin>

The binder resin to be added to the reaction solution is a nonionic polymer not involved in the reaction between the ink and the reaction solution. A nonionic water-soluble polymer is preferred. Preferable examples of binder resins include polyacryl amide, polyvinyl pyrolidone, water-soluble celluloses such as carboxymethyl cellulose, hydroxymethyl cellulose and hydroxypropyl cellulose, polyvinyl methyl ether, polyvinyl acetal and polyvinyl alcohol, but the binder resins are not limited to these examples as a matter of course. Among them, polyvinyl acetal and polyvinyl alcohol are especially preferable.

It is possible to use a polymer having an anion unit or cation unit added to such a nonionic polymer as long as the ink and the reaction solution can retain their respective essential performance in image formation. Furthermore, the above described polymer compound is ideally a water-soluble polymer, but may be a dispersion such as a latex or emulsion.

The amount of the above-described nonionic polymer added is preferably 0.01 to 20% by weight based on the total amount of reaction solution.

<Aqueous Medium>

The reaction solution of the present invention is made by dissolving or dispersing the above described components in an aqueous medium, but a mixed solvent of water and a water-soluble organic solvent is usually used. For the water-soluble organic solvent, those having the effect of preventing the reaction solution from drying are especially preferable. Specific examples include alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; alkylene diols such as 1,2-hexanediol; polyalkylene glycols such as polyethylene glycol and polypropylene glycol; alkylene glycols of which alkylene group has 2–6 carbon atoms such as ethylene glycol, propylene glycol, butyrene glycol, triethylene glycol, 1,2,6-hexanetriol, thiodiglycol, hexylene glycol and diethylene glycol; lower alkyl ether acetates such as polyethyleneglycol monomethyl ether acetate; glycerin; lower alkyl ethers of polyhydric alcohols such as ethyleneglycol monomethyl (or ethyl) ether, diethyleneglycol methyl(or ethyl) ether, and triethyleneglycol monomethyl (or ethyl) ether; polyhydric alcohols such as trimethylolpropane and trimethylolethane; N-methyl-2-pyrrolidone, 2-pyrrolidone, 1,3-dimethyl-2-imidazolidinone. A water-soluble organic solvent, as listed above, can be used alone or as a mixture. As water, demineralized water is preferably used.

The content of water-soluble organic solvent contained in the reaction solution according to this embodiment is not specifically limited, but is preferably in the range of 3 to 50 wt % based on the total amount of the reaction solution. In addition, the content of water contained in the liquid composition is preferably in the range of 50 to 95 wt % based on the total amount of liquid composition.

Furthermore, a surfactant, an anti-foam agent, a preservative, an anti-mold agent may be added as required in addition to the components described above for allowing the liquid composition to have desired properties. For example, by adding a nonionic surfactant of acetylene glycol/ethylene oxide adduct, the permeability is increased, and thus the nonionic surfactant can be suitably used for adjustment of the Ka value.

In addition, in the present invention, the pH of the reaction solution is kept at preferably 2 to 7, more preferably 3 to 6. As long as the pH is within this range, polyvalent metal ions can exist in the reaction solution with stability, thus making it possible to maintain a sufficient level of reactivity of the reaction solution.

Furthermore, in the present invention, if the pH of the reaction solution is lower than the pH of the ink, the reaction between the ink and the reaction solution more effectively proceeds, and more preferable results are obtained in terms of solid uniformity and strike through characteristics of printed matters, and the like.

pH of the reaction solution and the ink in the present invention can be measured by a normal method at 25° C.

Since the reaction solution of the present invention having the composition described above is used with an ink for image formation, it is preferable that the reaction solution contains no coloring material, and is a colorless solution having no absorption in a visible range in consideration of influences on the image. However, the reaction solution does not necessarily conform to this requirement, and a lightly colored solution having an adsorption in a visible range may be used as long as the actual image is not influenced.

[Ink]

The reaction solution of the present invention having the composition described above is used with at least one ink for image formation. Particularly, the reaction solution is used for recording in combination with an ink containing a coloring material dispersed or dissolved in an aqueous medium by the action of ionic groups, whereby the previously described preferable effect is achieved in inkjet recording. Inks suitably used in the present invention include pigment inks using pigments as coloring materials (micro-capsulated pigments, colored resins and the like are also categorized as pigments in this application). Components such as pigments and aqueous media constituting inks will be described in detail below.

<Pigments>

Pigments capable of being used in the present invention include, for example, carbon black and organic pigments.

<Carbon Black>

As carbon black, a carbon black pigment such as furnace black, lampblack, acetylene black or channel black can be used: examples of which include Raven 7000, Raven 5750, Raven 5250, Raven 5000, Raven 3500, Raven 2000, Raven 1500, Raven 1250, Raven 1200, Raven 1190ULTRA-II, Raven 1170, Raven 1255 (manufactured by Columbian Chemicals Company); BlackPearles L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Valcan XC-72R (manufactured by Cabot Corporation); ColorBlack FW1, ColorBlack FW2, ColorBlack FW2V, Color Black FW18, Color Black FW200, Color Black S150, Color Black S160, Color Black S170, Printex 35, Printex U, Printex V, Printex 140U, Printex 140V, SpecialBlack 6, SpecialBlack 5, SpecialBlack 4A and SpecialBlack 4 (manufactured by Degussa AG); and No. 25, No. 33, No. 40, No. 47, No. 52, No. 900, No. 2300, MCF-88, MA600, MA7, MA8 and MA100 (manufactured by Mitsubishi Chemical Corporation). However, carbon black is not limited thereto, but well-known carbon black can be used. Further, magnetic microparticles such as magnetite and ferrite as well as titanium black or the like may also be used as a black pigment.

<Organic Pigment>

Organic pigments include, for example, insoluble azo pigments such as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives from vat dyes such as Allizarine, Indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange, and Benzimidazolone Red; Pyranthrone pigments such as Pyranthrone Red and Pyranthrone Orange; indigo pigments; condensed azo pigments; thioindigo pigments; and other pigments such as Flavanthrone Yellow, Acylamide Yellow, Quinophtharone Yellow, Nickel Azo Yellow, Copper Azomethine Yellow, Perynone Orange, Anthrone Orange, Dianthraquinonyl Red and Dioxadine Violet.

Examples of organic pigments represented by color index (C. I.) numbers include C. I. Pigment Yellow 12, 13, 14, 17, 20, 24, 74, 83, 86, 93, 109, 110, 117, 120, 125, 137, 138, 147, 148, 151, 153, 154, 166, and 168; C. I. Pigment Orange 16, 36, 43, 51, 55, 59, and 61; C. I. Pigment Red 9, 48, 49, 52, 53, 57, 97, 122, 123, 149, 168, 175, 176, 177, 180, 192, 215, 216, 217, 220, 223, 224, 226, 227, 228, 238, and 240; C. I. Pigment Violet 19, 23, 29, 30, 37, 40, and 50; C. I. Pigment Blue 15, 15:3, 15:1, 15:4, 15:6, 22, 60, and 64; C. I. Pigment Green 7 and 36; and C. I. Pigment Brown 23, 25, and 26. Of course, well known organic pigments other than those listed above can be used.

<Dispersants>

When the carbon black or organic pigment described above is used, a dispersant is preferably used. For the dispersant, a dispersant capable of dispersing the above pigment in an aqueous medium by action of an anionic group is suitable. Specific examples of dispersants include, for example, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic acid half ester copolymers, vinyl naphthalene-acrylic acid copolymers, vinyl naphthalene-maleic acid copolymers, styrene-maleic anhydride-maleic acid half ester copolymers and salts thereof.

In addition, the weight average molecular weight for these dispersants is preferably in the range of 1,000 to 30,000, especially preferably 3,000 to 15,000.

In addition, the acid value of the dispersant is preferably 300 mg KOH/g or less in view of compatibility between the reliability as ink such as discharge stability and storage stability and the reactivity with the reaction solution. The acid value of the dispersant is more preferably 100 mg KOH/g to 300 mg KOH/g. In addition, the amount of dispersant added is preferably 0.1 to 3-fold based on the content (wt %) of the coloring material in the ink for the same reason as with the acid value, and is more preferably 0.2 to 2-fold. If the acid value of the dispersant or the addition amount of the dispersant is increased in view of reliability of the ink, the ink tends to become more stable to the reaction solution. In this case, a sufficient level of image performance can be achieved by increasing the amount of polyvalent metal ion in the reaction solution, which, however, may cause pH drop in the reaction solution. Therefore, it is preferable that the amount of a substance having a buffering action is also increase as required.

<Self-Dispersing Pigment>

In the present invention, the pigment may be a self-dispersing pigment, a pigment dispersing in an aqueous medium without using a dispersant, which is obtained by binding an ionic group (anionic group) to the surface of the pigment. One example of such pigments is self-dispersing carbon black. Self-dispersing carbon black is, for example, carbon black having an anionic group bound on its surface (anionic carbon black). The self-dispersing pigment will be described below using carbon black as an example.

<Anionic Carbon Black>

Anionic carbon black is carbon black having bound on the surface thereof at least one anionic group selected from —COO(M2), —SO$_3$(M2), —PO$_3$H(M2) and —PO$_3$(M2)$_2$. In the above formula, M2 represents a hydrogen atom, alkali metal, ammonium or organic ammonium.

Among them, in particular, anionically charged carbon black having —COO(M2) or —SO$_3$(M2) on its surface is excellent in dispersibility in the ink, and therefore can be especially suitably used in the present invention. Specific Examples of alkali metals of those expressed by "M2" in the above hydrophilic groups include, for example, Li, Na, K, Rb and Cs. In addition, specific examples of organic ammonium include, for example, methyl ammonium, dimethyl ammonium, trimethyl ammonium, ethyl ammonium, diethyl ammonium, triethyl ammonium, methanol ammonium, dimethanol ammonium and trimethanol ammonium.

If an ink containing self-dispersing carbon black having ammonium or organic ammonium as M2 is used, water resistance of recorded images can be further improved, and the ink is especially suitable in this respect. This is considered ascribable to decomposition of ammonium and evaporation of ammonia when the ink is applied on a recording medium. Here, the self-dispersing carbon black having ammonium as "M2" is obtained by replacing alkaline metal M2 of a self-dispersing carbon black with ammonium by an ion exchange method, or by a method where an acid is added to convert "M2" into an H type, and then ammonium hydroxide is added to convert "M2" into ammonium, for example.

Other methods for producing anionically charged self-dispersing carbon black include, for example, a method in which carbon black is oxidization-treated with sodium hypochlorite. For example, a —COONa group can be chemically boned to the surface of carbon black by this method.

A variety of hydrophilic groups described above may be bound directly to the surface of the carbon black. Alternatively, the hydrophilic group may be bound indirectly to the surface of carbon black with another atomic group existing between the surface of carbon black and the hydrophilic group. Here, specific examples of other atomic groups include, for example, straight-chain or branched alkylene groups each having 1 to 12 carbon atoms, substituted or unsubstituted phenylene groups and substituted or unsubstituted naphthylene groups. Here, substituent groups of the phenylene group and the naphthylene group include, for example, straight-chain or branched alkyl groups each having 1 to 6 carbon atoms. In addition, specific examples of combinations of other atomic groups and hydrophilic groups include, for example, —C$_2$H$_4$COO(M2), -Ph-SO$_3$(M2) and -Ph-COO(M2) (Ph represents a phenyl group).

In the present invention, two or more types may be selected as appropriate from the above described types of self-dispersing carbon black for use in the coloring material of the ink. In addition, the amount of self-dispersing carbon black added in the ink is preferably in the range of 0.1 to 15%, especially preferably 1 to 10% by weight based on the total amount of ink. By keeping the amount of self-dispersing carbon black in this range, the self-dispersing carbon black can be kept in an adequate dispersed state in the ink. Furthermore, for the purpose of adjusting the color tone of the ink, a dye may be added as a coloring material in addition to self-dispersing carbon black.

<Colored Fine Particles/Micro-Capsulated Pigments>

Besides those described above as coloring materials, pigments micro-capsulated with polymers and the like, colored fine particles with a coloring material covering the resin particles, and the like may be used. As for the microcapsule, it essentially has dispersibility in an aqueous medium, but the dispersant described above may be made to coexist in the ink for improving dispersion stability. In addition, if colored fine particles are used as a coloring material, the above described anionic dispersant or the like is preferably used.

<Aqueous Medium>

The aqueous medium for dispersing the above-described pigments is not specifically limited, and aqueous media similar to those described as aqueous media for the reaction solution may be used. In addition, when the color ink is applied on the recording medium by the inkjet method (e.g., Bubble Jet(R) method etc.), the aqueous medium is preferably adjusted to have a viscosity and surface tension desired for the ink so that the ink has excellent inkjet discharge characteristics as described previously. Examples of aqueous media that can be used in inks in the present invention include, for example, water, and mixed solvents of water and water-soluble organic solvents. For the water-soluble organic solvents, those having the effect of preventing the ink from being dried are especially preferable.

Specific examples include alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols of which alkylene group has 2 to 6 carbon atoms such as ethylene glycol, propylene glycol, butyrene glycol, triethylene glycol, 1,2,6-hexanetriol, thiodiglycol, hexylene glycol, and diethylene glycol; lower alkyl ether acetates such as polyethyleneglycol monomethyl ether acetate; glycerin; lower alkyl ethers of polyhydric alcohols such as ethyleneglycol monomethyl (or ethyl) ether, diethyleneglycol methyl (or ethyl) ether and triethyleneglycol monomethyl (or ethyl) ether; polyhydric alcohols such as trimethylolpropane and trimethylolethane; N-methyl-2-pyrrolidone, 2-pyrrolidone, 1,3-dimethyl-2-imidazolidinone. A water-soluble organic solvent, as listed above, can be used alone or as a mixture. Further, demineralized water is preferably used as water.

The amount of a water-soluble organic solvent contained in an ink used in the present invention is, but not limited thereto, preferably 3 to 50% by weight based on the total amount of ink. Further, the amount of water contained in an ink is preferably 50 to 95% by weight based on the total amount of ink. Furthermore, besides the components described above, a humectant may be added as required as a matter of course, and also a surfactant, an anti-foam agent, a preservative, an anti-mold agent and the like may be added for providing an ink having desired property values.

[Ink Set]

The color of the ink when the ink described above is combined with the reaction solution described previously to prepare an ink set of the present invention is not specifically limited, and the ink may have one color selected from, for example, yellow, magenta, cyan, red, green, blue and black. Specifically, a selection may be made from the coloring materials described previously so that the ink has a desired color tone. In addition, the ink that is combined with the reaction solution is not limited to one type, but an aspect in which two or more inks having different colors are combined together to provide an ink set suitable for formation of multicolored images is more preferable. The content of coloring material in each ink may be selected as appropriate so that the ink has excellent inkjet discharge characteristics when used in inkjet recording, and the ink has a desired color tone and density. As a guide, for example, the content of coloring material is preferably in the range of 1 to 50% by weight based on the total amount of ink. Furthermore, in this case, at least one ink of two or more inks should react with the reaction solution.

For example, as long as there is an ink with a coloring material dispersed in an aqueous medium by the action of an ionic group, other inks may be inks containing dyes as coloring materials and, of course, all inks may be inks with coloring materials dispersed in aqueous media by the action of ionic groups. If the ink set having such a configuration is used, bleeding occurs when inks of different color tones are applied contiguously on the recording medium, which poses a problem when a multicolored image is formed by an inkjet apparatus. More specifically, bleeding posing a problem in the inkjet multicolored image is especially remarkable between a black ink and other color inks (e.g., at least one ink selected from a yellow ink, a magenta ink, a cyan ink, a red ink, a green ink and a blue ink). Thus, for example, a black ink with a pigment dispersed in an aqueous medium by the action of an ionic group is preferably combined as an ink to be destabilized by the reaction solution of the present invention. Other color inks may be inks with dyes dissolved in aqueous media. Of course, all other inks may be such an ink of which coloring material is dispersed in an aqueous medium by the action of ionic groups and destabilized with the reaction solution, as the black ink described above.

[Recording Method and Apparatus]

The reaction solution of the present invention is used for forming images in combination with an ink that is destabilized by the reaction solution. In the present invention, at least application of the ink is carried out by the ink jet recording system. More specifically, the recording method of the present invention comprises the steps of coating a reaction solution on at least an area of a recording medium on which an ink is to be applied, and then applying the ink on the recording medium with an inkjet system, whereby the coloring agent in the ink is agglomerated or gelated on the recording medium by the action of the reaction solution. Thus high quality images of high density and improved color development performances can be obtained without color bleed, or strike-through of the coloring material to the print backside. That is, in the reaction solution of the present invention, the solution properties are inhibited from changing with time, so that no significant change in reactivity of the reaction solution with the ink is caused when the reaction solution is stored, and the reaction solution causes no problem as to the wetting properties of relevant equipment members, and thus is excellent in storage stability, thus making it possible to obtain high quality images as described above with stability.

The reaction solution of the present invention can be applied onto the recording medium by the inkjet recording system as with the ink itself, or by coating the recording medium with the reaction solution of the present invention on the recording medium using a roller or the like. The latter is preferable because it can be done regardless of discharge properties of the reaction solution.

The amount of reaction solution applied on the recording medium may be adjusted as appropriate depending on the type and quantity of the polyvalent metal ion in the reaction solution as well as the ink to be reacted with the reaction solution, but it is preferably 0.5 g/m$^2$ to 10 g/m$^2$ in view of uniformity of the solid image and fixation characteristics of resulting images of recorded matters. It is further preferably in the range of greater than 2 g/m$^2$ to 5 g/m$^2$.

<Inkjet Recording Apparatus>

Figure 1:
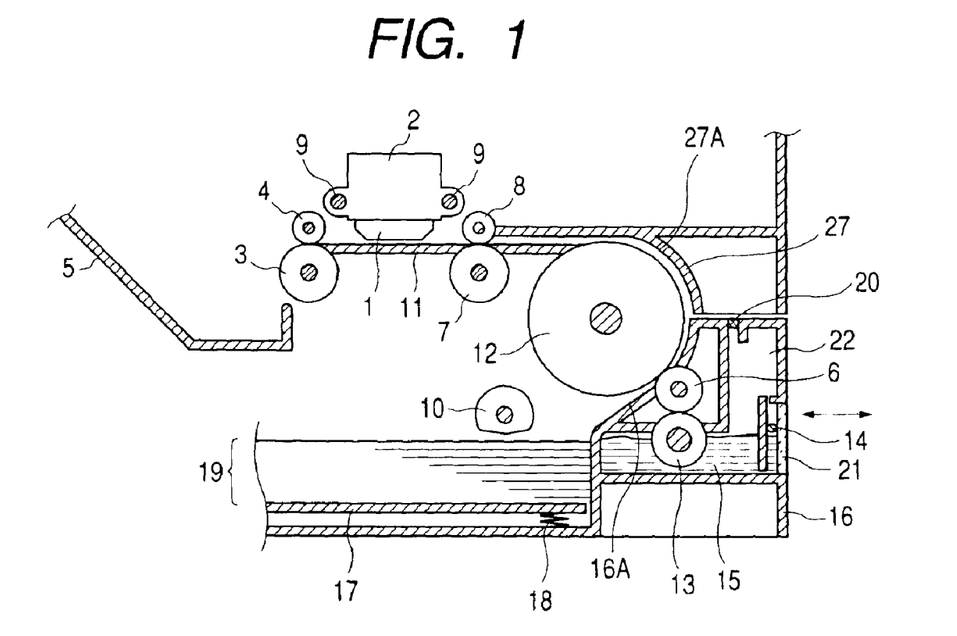
FIG. 1 is a schematic sectional side view showing one example of an inkjet recording apparatus of the present invention.

FIG. 1 shows one example of the inkjet recording apparatus.

This image forming apparatus employs a serial-type inkjet recording system, and comprises a recording head 1, a sheet feeding cassette 16 comprised of a sheet feeding tray 17 for feeding a recording medium (hereinafter referred to also as recording paper) 19 and means for coating the reaction solution of the present invention integrally; drive means for making the recording head travel both ways in a direction orthogonal to the direction in which the recording paper is conveyed, and control means for controlling the drive of these elements.

The recording head 1 is mounted on a carriage 2 in such a manner that the face on which ink discharge ports are provided is facing to the platen 11. The recording head 1 comprises the ink discharge ports described above, electrothermal converters (e.g., heat elements) to heat the ink and a substrate supporting them (not shown). Furthermore, the recording head 1 has an ink cartridge installed in a carriage placed in the upper part thereof.

The carriage 2 has the recording head 1 mounted thereon, and can travel both ways along two guide shafts 9 extending in parallel along the width direction of the recording paper 19. In addition, the recording head 1 is driven to discharge ink droplets to the recording paper 19 in synchronization with the carriage traveling both ways to form an image.

The sheet-feeding cassette 16 is detachable from the main body of the image forming apparatus. The sheets of recording paper 19 are stacked on the sheet-feeding tray 17 in the sheet-feeding cassette 16. At the time of sheet feeding, the uppermost sheet is pressed against a sheet-feeding roller 10 by a spring 18 pressing upward the sheet-feeding tray 17. This sheet-feeding roller 10 is nearly semicircle in cross section, and rotated by a motor (not shown) to feed only the uppermost recording paper 19 with a separation claw (not shown).

The separately fed recording paper 19 is conveyed along a guide surface 16A of the sheet feeding cassette 16 and a guide surface 27A of a paper guide 27 by the action of a large diameter intermediate roller 12 and a small diameter coating roller 6 pressed against the intermediate roller 12. These guide surfaces are curved in an arc concentric with the intermediate roller 12. Thus, the recording paper 19 is conveyed along these guide surfaces 16A and 27A to reverse its conveyance direction. That is, the printing side of the recording paper 19 faces downward until the recording paper 19 reaches the intermediate roller 12 from the sheet-feeding tray 17, but faces upward when the recording paper 19 faces to the recording head 1. Thus, the printing side of the recording paper always faces out of the image forming apparatus.

The reaction solution applying means is provided in the sheet-feeding cassette 16, and comprises a supply tank 22 for supplying a reaction solution 15, the supply roller 13 rotatably supported of which circumferential face is partly dipped in the tank 22, and the coating roller 6 placed in parallel to and in contact with the supply roller 13 to rotate in the same direction. Further, the coating roller 6 is arranged in such a manner that its circumferential face is in contact with and parallel to the intermediate roller 12 that conveys the recording paper 19. Thus, when the recording paper 19 is conveyed, the intermediate roller 12 and the coating roller 6 rotate in association with rotation of the intermediate roller 12. As a result, the reaction solution 15 is supplied to the circumferential face of the coating roller 6 by a supply roller 13, and the reaction solution is applied uniformly by the coating roller 6 to the printing side of the recording paper 19 held between the coating roller 6 and the intermediate roller 12.

In addition, the image forming apparatus is provided with a float 14 in the supply tank 22. This float 14 is smaller in specific gravity than the reaction solution 15, and floats on the surface of the reaction solution, thereby enabling the residual amount of reaction solution to be visually checked externally through a level indication window 21 made of transparent member.

Figure 2:
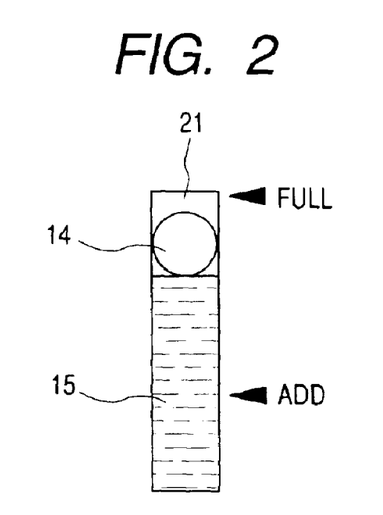
FIG. 2 is a sectional front view of a reaction solution level indicator installed in the inkjet recording apparatus of the present invention.

FIG. 2 shows a level indicator viewed from the front. In the level indicator, an indicator indicating a level of reaction solution is provided along the long direction of the level indication window 21. In this figure, the tank is full with the reaction solution when the level of the reaction solution or the float 14 reaches the position marked as "Full." On the other hand, if the level of the reaction solution or the float 14 is in the position marked as "Add," it indicates that the level of reaction solution is low. Thus, one can easily know that the reaction solution should be supplied seeing the level of the reaction solution 15 gradually drops and the float 14 reaches the Add line.

Figure 3:
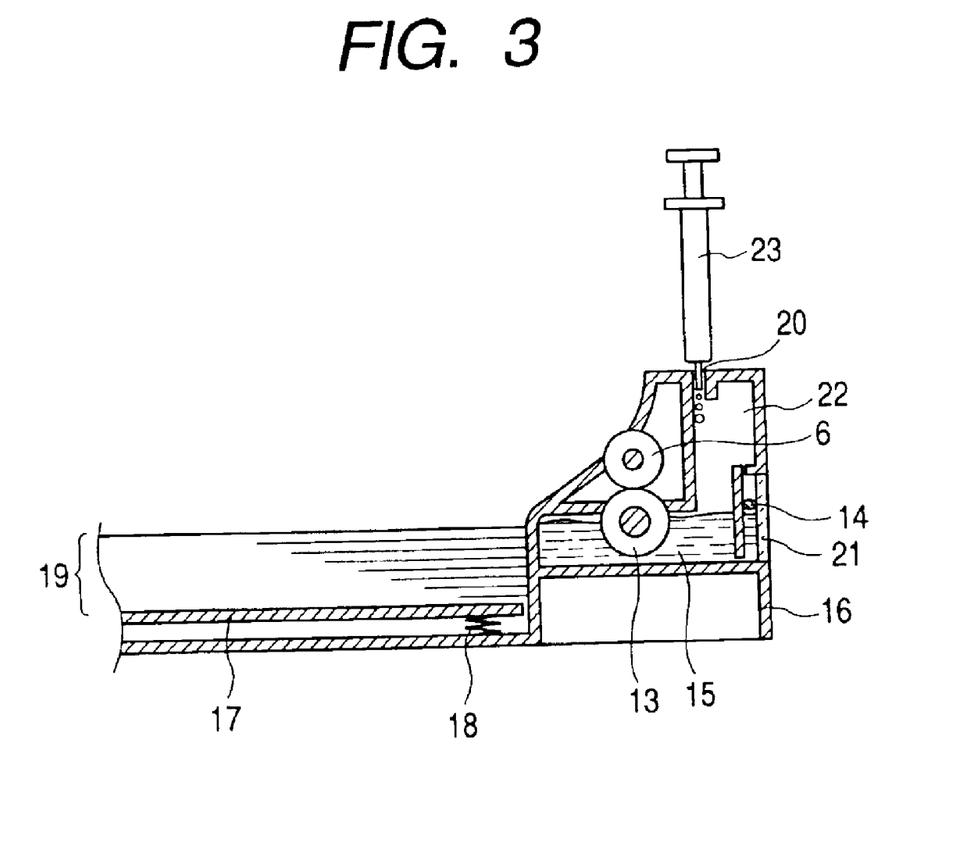
FIG. 3 is a schematic sectional side view showing a reaction solution supply state of the inkjet recording apparatus of the present invention.

To supply the reaction solution, the sheet feeding cassette 16 is pulled out of the main body of image forming apparatus, and the tip of an injector 23 is inserted into an inlet 20 made of a split-rubber member to inject the reaction solution into the supply tank 22, as shown in FIG. 3.

In this way, the recording paper coated with the reaction solution is then conveyed at a certain speed by a main conveying roller 7 and a pinch roller 8 pressed against the main conveying roller 7 to reach the recording unit, where the ink is applied on the recording paper 19 from the recording head 1. The recording sheet 19 fed and printed in the configuration described above is discharged and conveyed by a sheet discharge roller 3 and a spur 4 pressed against the sheet discharge roller 3, and is then stacked on a sheet discharge tray 5.

In addition, when the reaction solution is applied by a roller, etc., it is preferable that the viscosity of the reaction solution is greater than that of the ink in view of effective ink destabilization, the smaller application amount of the reaction solution, and fixability of recorded matters. More specifically, the higher is the viscosity of the reaction solution, the more polyvalent metal ions remain on the upper region of the recording medium, that is, more effective reaction with the ink.

For the ink, on the other hand, quicker solid-liquid separation is preferable in view of fixability. Here the solid-liquid separation means that after the ink reacts with the reaction solution, coloring material in the ink remains on the upper region of the recording medium while the liquid medium such as a solvent or water quickly permeates into the recording medium. Thus, an ink of lower viscosity is more preferable.

On the other hand, when both the ink and reaction solution of the present invention are applied on the recording medium by the inkjet method, there are various possible application orders onto the recording medium as shown below, and any method may be selected as appropriate:
a) The reaction solution is printed, and then the ink is printed;
b) The ink is printed, and then the reaction solution is printed;
c) The ink is printed, then the reaction solution is printed, and then the ink is printed; or
d) The reaction solution is printed, then the ink is printed, and then the reaction solution is printed.

In view of the object of the present invention, the method a) or d) including at least a step of recording the reaction solution on the recording medium prior to the ink is preferable.

Figure 4:
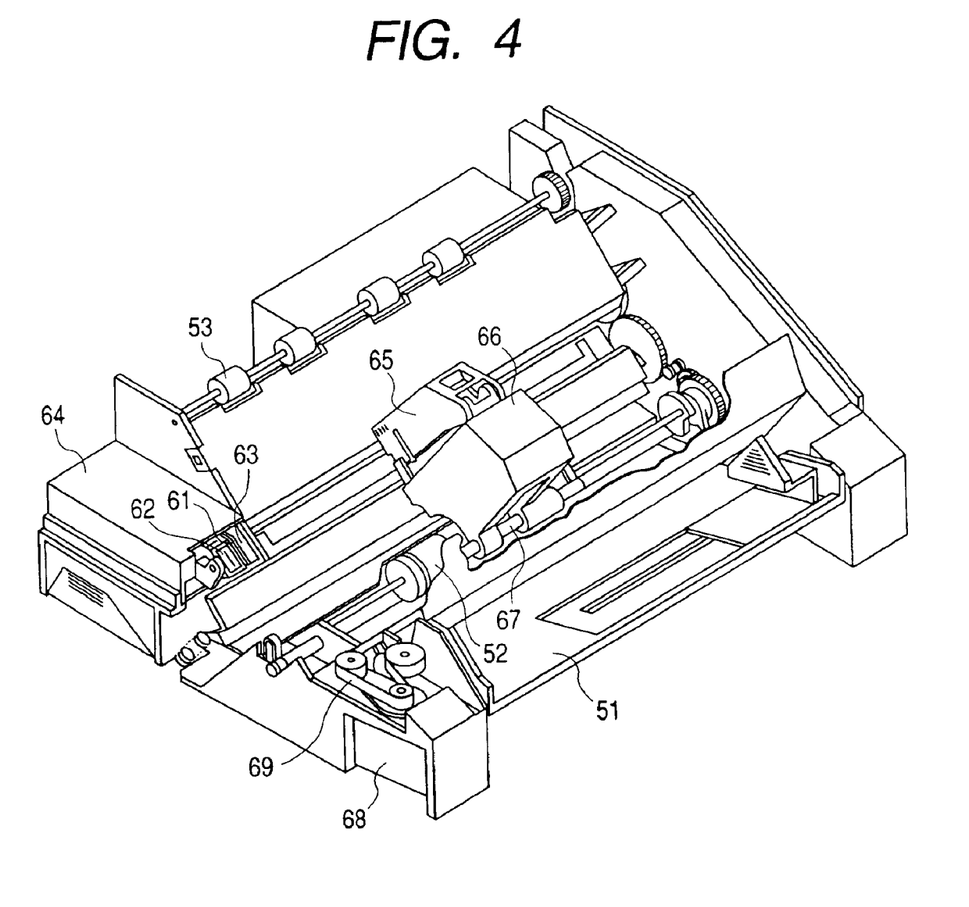
FIG. 4 is a schematic perspective view showing one example of the inkjet recording apparatus of the present invention.

Another example of inkjet recording apparatus is shown in FIG. 4. In FIG. 4, the blade 61 is a wiping member, one end of which is a fixed end held by a blade-holding member to cantilever. The blade 61 is provided at a position adjacent to a region in which a recording head 65 operates, and in this example, is held in such a form that it protrudes into the path of the recording head 65.

Reference numeral 62 designates a cap for an ejection opening of the recording head 65, and the cap is arranged in a home position adjacent to the blade 61, moves in the direction perpendicular to the moving direction of the recording head 65, and caps the ink-ejecting opening when touching it. Numeral 63 designates an ink-absorber provided adjacent to the blade 61, which is held in the moving path of the recording head 65 in a projecting form like the blade 61. The above blade 61, cap 62 and ink-absorber 63 constitute an ejection recovery part 64, and the blade 61 and the ink-absorber 63 serve to remove moisture and dust on the ink-ejecting opening.

Reference numeral 65 designates a recording head. The head contains an energy generating means for ink ejection and performs recording by ejecting ink towards a recording medium opposite to the ink-ejecting opening. Numeral 66 designates a carriage for carrying the recording head 65 to move it. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording head 65 can move in the recording region and the region adjacent thereto. Reference numeral 51 designates a recording medium feeding part for inserting a recording medium and numeral 52 designates a paper-delivery roller driven by a motor not shown in the figure.

With such an arrangement, the recording medium is fed to the position opposite to the ink ejecting opening of the recording head 65 and conveyed to a paper output portion provided with a paper output roller 53 as recording proceeds. In the above arrangement, while the recording head returns to its home position after recording, the cap 62 of the ejection recovery part 64 recedes from the moving path of the recording head, but the blade 61 is projecting in the moving path. As a result, the ink ejecting opening of the recording head 65 is wiped. When the cap 62 comes into contact with the ejection opening face of the recording head 65 to cap it, the cap 62 moves so as to protrude into the path of motion of the recording head 65. When the recording head 65 is moved from its home position to the position at which recording is started, the cap 62 and the blade 61 are at the same positions as the wiping position as described above. As a result, the ejection opening of the recording head 65 is also wiped at the time of this movement.

The above movement of the recording head 65 to its home position is made not only when the recording is completed or for ejection recovery, but also when the recording head 65 is moving in the recording region for recording, that is, it moves to the home position adjacent to the recording region at given intervals during recording, so as to wipe the ejection opening face with this movement.

<Ink Properties: Inkjet Discharge Properties, Permeability to Recording Medium>

The ink set according to the present invention is especially suitable for inkjet recording. Inkjet recording methods include a recording method in which mechanical energy is exerted on the ink to discharge liquid droplets, and a recording method in which heat energy is applied to the ink to foam the ink to discharge liquid droplets, and the ink of the present invention can be discharged by these recording methods. In this case, the ink of the present invention described above is preferably capable of being discharged from an inkjet head. For the properties of the ink, it is preferable that, for example, the viscosity is 1 to 15 mPa·s, and the surface tension is 25 mN/m (dyne/cm) or greater, and it is especially preferable that the viscosity is 1 to 5 mPa·s, and the surface tension is 25 to 50 mN/m (dyne/cm) in view of dischargeability from the inkjet head. Furthermore, since the reaction solution of the present invention should react with only a specific ink on a recording medium such as paper, it is preferable that the surface tension of the reaction solution is within a range allowing the reaction solution to be discharged from the inkjet head, and is also greater than that of the ink to be destabilized by the reaction solution so that the reaction solution does not spread to areas other than areas of recording by the ink.

<Ink Cartridge>

Figure 5:
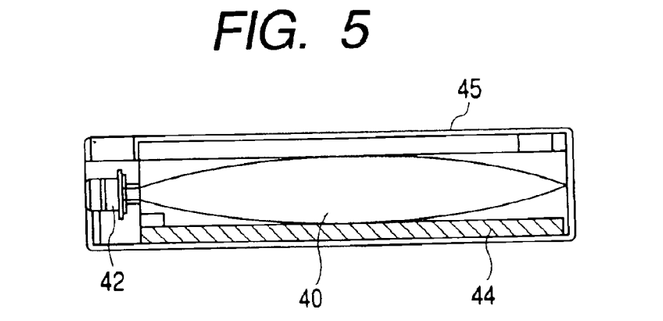
FIG. 5 is a longitudinal sectional view showing one example of an ink cartridge.
Figure 6:
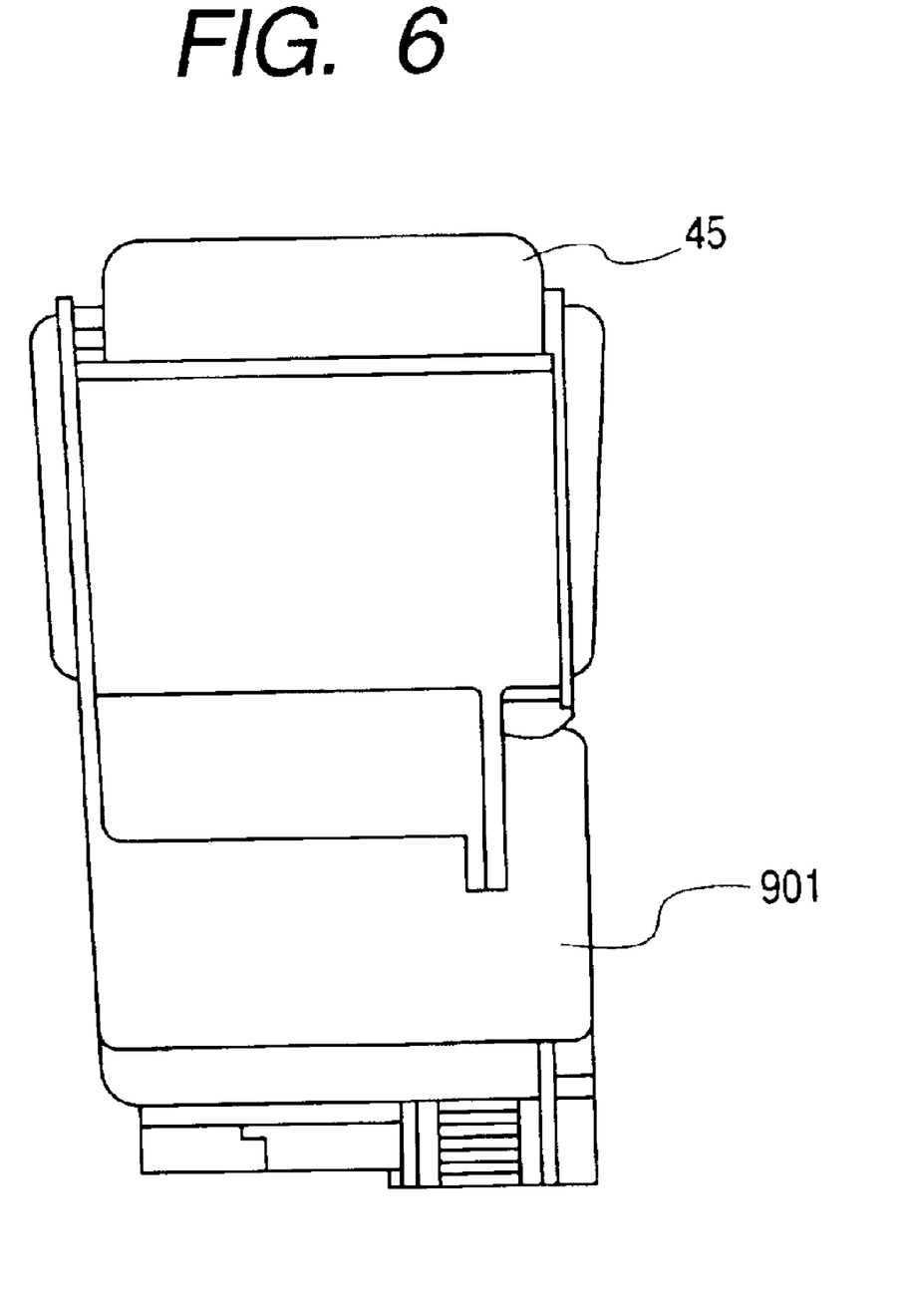
FIG. 6 is a schematic plan view showing a state in which the ink cartridge according to one embodiment of the present invention is installed in a recording head.

FIG. 5 shows one example of an ink cartridge for storing ink for feeding ink to the recording head through an ink feeding member such as a tube. In the drawing, reference numeral 40 denotes a member constituting the ink cartridge 45, an ink storage portion such as an ink bag, whose tip is equipped with a rubber stopper 42. The ink in the ink bag 40 can be fed to the recording head by inserting a needle (not shown in the figure) into the stopper 42. Numeral 44 designate an ink absorber for receiving waste ink. For the ink storage portion, its surface in contact with ink is preferably made of polyolefin, particularly polyethylene. Such a cartridge is configured such that the cartridge can be attached to and detached from a recording head 901 discharging the ink or reaction solution, and the ink or reaction solution is supplied to the recording head 901 when the cartridge 45 is mounted on the recording head.

EXAMPLES

The present invention will be described more specifically below using Examples and Comparative Examples, but the present invention is not limited to the Examples described below as long as there is no departure from the substance of the invention. Furthermore, "%" means "% by weight" unless otherwise specified.

<Reaction Solutions>

Components described below were mixed, sufficiently stirred and dissolved, and this solution was then filtered under pressure through a micro-filter filter with the pore size of 0.2 μm (manufactured by Fuji Photo Film Co., Ltd.) to prepare reaction solutions 1 to 11.

The Ka value of each reaction solution was measured using Dynamic Permeability Tester S (manufactured by Toyo Seiki Seisakusho, Ltd.) for liquid by the Bristow method with Canon PB Paper as a recording medium. The viscosity and pH of each reaction solution and ink, a viscometer (VISCOMETER RE-80L manufactured by Toki Sangyo Co., Ltd.) were determined by using a pH meter (pH METER F-21 manufactured by HORIBA Ltd.), and the measurements were carried out at 25° C.

Reaction Solution 1

| | |
|---|---|
| yttrium nitrate (hexahydrate) | 7 parts |
| polyvinyl alcohol (polymerization degree 1700, hydrolysis degree 88%) | 3 parts |
| 1,2,6-hexanetriol | 27 parts |
| acetylene glycol/ethylene oxide adduct (trade name: Acetylenol E100 (manufactured by Kawaken Fine Chemicals Co., Ltd.)) | 12 parts |
| water | residual quantity |

Reaction Solution 2

| | |
|---|---|
| yttrium nitrate (hexahydrate) | 7 parts |
| polyvinyl alcohol (polymerization degree 1700, hydrolysis degree 88%) | 3 parts |
| 1,2,6-hexanetriol | 27 parts |
| acetylene glycol/ethylene oxide adduct (trade name: Acetylenol E100 (manufactured by Kawaken Fine Chemicals Co., Ltd.)) | 5 parts |
| water | residual quantity |

Reaction Solution 3

| | |
|---|---|
| yttrium nitrate (hexahydrate) | 7 parts |
| polyvinyl alcohol (polymerization degree 1700, hydrolysis degree 88%) | 3 parts |
| 1,2-hexanediol | 27 parts |
| acetylene glycol/ethylene oxide adduct (trade name: Acetylenol E100 (manufactured by Kawaken Fine Chemicals Co., Ltd.)) | 1 part |
| water | residual quantity |

Reaction Solution 4

| | |
|---|---|
| yttrium nitrate (hexahydrate) | 7 parts |
| polyvinyl alcohol (polymerization degree 1700, hydrolysis degree 88%) | 3 parts |
| 1,2,6-hexanetriol | 15 parts |
| 1,2-hexanediol | 12 parts |
| acetylene glycol/ethylene oxide adduct (trade name: Acetylenol E100 (manufactured by Kawaken Fine Chemicals Co., Ltd.)) | 1 part |
| water | residual quantity |

Reaction Solution 5

| | |
|---|---|
| yttrium nitrate (hexahydrate) | 7 parts |
| polyvinyl alcohol (polymerization degree 1700, hydrolysis degree 88%) | 3 parts |
| trimethylolpropane | 20 parts |
| acetylene glycol/ethylene oxide adduct (trade name: Acetylenol E100 (manufactured by Kawaken Fine Chemicals Co., Ltd.)) | 1 part |
| water | residual quantity |

Reaction Solution 6

| | |
|---|---|
| yttrium nitrate (hexahydrate) | 7 parts |
| polyvinyl alcohol (polymerization degree 1700, hydrolysis degree 88%) | 3 parts |
| 1,2,6-hexanetriol | 27 parts |
| acetylene glycol/ethylene oxide adduct (trade name: Acetylenol E100 (manufactured by Kawaken Fine Chemicals Co., Ltd.)) | 1 part |
| water | residual quantity |

Reaction Solution 7

| | |
|---|---|
| yttrium nitrate (hexahydrate) | 7 parts |
| polyvinyl alcohol (polymerization degree 1700, hydrolysis degree 88%) | 3 parts |
| acetylene glycol/ethylene oxide adduct (trade name: Acetylenol E100 (manufactured by Kawaken Fine Chemicals Co., Ltd.)) | 1 part |
| water | residual quantity |

Reaction Solution 8

| | |
|---|---|
| yttrium nitrate (hexahydrate) | 7 parts |
| polyvinyl alcohol (polymerization degree 1700, hydrolysis degree 88%) | 3 parts |
| polyethylene glycol (molecular weight 200) | 50 parts |
| acetylene glycol/ethylene oxide adduct (trade name: Acetylenol E100 (manufactured by Kawaken Fine Chemicals Co., Ltd.)) | 1 part |
| water | residual quantity |

Reaction Solution 9

| | |
|---|---|
| yttrium nitrate (hexahydrate) | 7 parts |
| polyvinyl alcohol (polymerization degree 1700, hydrolysis degree 88%) | 3 parts |
| 1,2-hexanediol | 5 parts |
| acetylene glycol/ethylene oxide adduct (trade name: Acetylenol E100 (manufactured by Kawaken Fine Chemicals Co., Ltd.)) | 17 parts |
| water | residual quantity |

Reaction Solution 10

| | |
|---|---|
| yttrium nitrate (hexahydrate) | 7 parts |
| polyvinyl alcohol (polymerization degree 1700, hydrolysis degree 88%) | 3 parts |
| acetylene glycol/ethylene oxide adduct (trade name: Acetylenol E100 (manufactured by Kawaken Fine Chemicals Co., Ltd.)) | 17 parts |
| water | residual quantity |

Reaction Solution 11

| | |
|---|---|
| yttrium nitrate (hexahydrate) | 7 parts |
| polyvinyl alcohol (polymerization degree 1700, hydrolysis degree 88%) | 3 parts |
| acetylene glycol/ethylene oxide adduct (trade name: Acetylenol E100 (manufactured by Kawaken Fine Chemicals Co., Ltd.)) | 3 part |
| water | residual quantity |

The Ka value, viscosity and pH of the above reaction solutions 1 to 11 are shown in Table 1. The Ka value of the reaction solution 8 was too small to determine.

TABLE 1

| | Ka value ($mL \cdot m^{-2} \cdot msec^{-1/2}$) | Viscosity (mPa·s) | pH |
|---|---|---|---|
| Reaction Solution 1 | 2.2 | 58 | 5.1 |
| Reaction Solution 2 | 1.6 | 38 | 4.8 |
| Reaction Solution 3 | 1.5 | 29 | 4.4 |
| Reaction Solution 4 | 1.3 | 30 | 4.4 |
| Reaction Solution 5 | 1.2 | 37 | 4.5 |
| Reaction Solution 6 | 1.1 | 33 | 4.5 |
| Reaction Solution 7 | 3.0 | 12 | 4.3 |
| Reaction Solution 8 | difficult to measure | 156 | 4.3 |
| Reaction Solution 9 | 2.7 | 20 | 5.2 |
| Reaction Solution 10 | 2.1 | 19 | 5.2 |
| Reaction Solution 11 | 3.1 | 15 | 4.6 |

<Cyan Pigment Dispersion>

Ten parts of pigment (C.I. pigment blue 15:3 (trade name: Fastgen Blue FGF manufactured by Dainippon Ink & Chemicals, Inc.), 20 parts of anionic polymer P-1 (styrene-acrylic acid copolymer, acid value 200, weight average molecular 10,000, aqueous solution with the solid content of 10%, neutralizing agent: potassium hydroxide) and 70 parts of pure water were mixed and put in a batch-type vertical sand mill (manufactured by IMEX Co., Ltd.), to which 150 parts of zirconia bead with the diameter of 0.3 mm were added, and the mixture was dispersed for 5 hours while cooling by water. This dispersion was centrifuged to remove coarse particles to obtain the final pigment dispersion C of which solid content was about 12% and the weight average particle size was 100 nm.

<Cyan Ink Composition>

The components described below were mixed, sufficiently stirred and dissolved, and this solution was then filtered under pressure through a micro-filter 3.0 μm pore size (manufactured by Fuji Photo Film Co., Ltd.) to prepare a cyan ink composition. The pH of the resultant cyan ink was 7.4, and the viscosity was 2.5 mPa·s.

| | |
|---|---|
| pigment dispersion C | 30% |
| glycerin | 9% |
| diethylene glycol | 6% |
| acetylene glycol/ethylene oxide adduct (trade name: Acetylenol E100 (manufactured by Kawaken Fine Chemicals Co., Ltd.)) | 1% |
| water | 54% |

The reaction solutions and the ink described above were used to form images for evaluation. Coating of a surface of recording paper with a reaction solution was carried out by using a coating roller, and immediately thereafter the ink was applied, by using an ink jet recording apparatus BJS700 (manufactured by Canon Inc.) having an on-demand type multi recording head that applies heat energy according to recording signals to the ink to discharge the ink. At that time, the roller speed and the contact pressure of the roller on the recording medium were adjusted to obtain a coating amount of 2.4 g/m². As the recording medium, Canon PB Paper was used. Evaluation items are shown below.

<Coating Uniformity>

Solid printing was performed to make evaluation on uniformity by visual observation.

-Evaluation Criteria-

AA: Uneven coating is not observed, and uniformity of the solid image is quite high.

A: Uneven coating is observed to some degree, but uniformity of the solid image is acceptable.

C: Uneven coating is clearly observed.

<Abrasion Resistance>

Letters (MS block, 14 point) and a solid 2 cm×2 cm square were printed, and the printed regions were rubbed with a finger to evaluate abrasion resistance.

-Evaluation Criteria-

A: Neither the letter part nor the solid part is smeared.

B: The letter part is not smeared, but the solid part is smeared.

C: Both the letter part and solid part are smeared.

The results of evaluation are shown in Table 2.

TABLE 2

| | Reaction Solution No. | Coating Uniformity | Abrasion Resistance |
|---|---|---|---|
| Example 1 | 1 | AA | A |
| Example 2 | 2 | A | A |
| Example 3 | 3 | A | A |
| Example 4 | 4 | A | A |
| Example 5 | 9 | AA | A |
| Comparative Example 1 | 5 | C | A |
| Comparative Example 2 | 6 | C | A |
| Comparative Example 3 | 7 | C | A |
| Comparative Example 4 | 8 | C | C |
| Comparative Example 5 | 10 | C | A |
| Comparative Example 6 | 11 | C | A |

As described above, the present invention provides a reaction solution, a set of the reaction solution and an ink, an inkjet recording apparatus and an image recording method using such a reaction solution. The reaction solution can be uniformly applied to the recording paper surface by roller coating to give a high quality color image having a high image density, free from uneven density and color bleeding, and having abrasion resistance.

What is claimed is:

1. A reaction solution for use in image recording in conjunction with an ink containing a coloring material in a dissolved or dispersed state, the reaction solution destabilizing the dissolved or dispersed state of the coloring material in the ink after contact with the ink, wherein the reaction solution contains at least a polyvalent metal ion and a nonionic polymer, the Ka value of the reaction solution according to the Bristow method is from 1.3 mL$\times$m$^{-2}\times$msec$^{-1/2}$ to 3.0 mL$\times$m$^{-2}\times$msec$^{-1/2}$ inclusive, and the viscosity of the reaction solution is from 20 mPa$\times$s to 150 mPa$\times$s inclusive.

2. The reaction solution according to claim 1, wherein the polyvalent metal ion is contained from 0.01% to 10% inclusive by weight based on the total amount of the reaction solution.

3. The reaction solution according to claim 1, wherein the pH of the reaction solution is from 2 to 7 inclusive.

4. A set of an ink and a reaction solution comprising the ink containing a coloring material in a dissolved or dispersed state, and the reaction solution destabilizing the dissolved or dispersed state of the coloring material in the ink after contact with the ink, wherein the reaction solution contains at least a polyvalent metal ion and a nonionic polymer, the Ka value of the reaction solution according to the Bristow method is from 1.3 mL$\times$m$^{-2}\times$msec$^{-1/2}$ to 3.0 mL$\times$m$^{-2}\times$msec$^{-1/2}$ inclusive, and the viscosity of the reaction solution is from 20 mPa$\times$s to 150 mPa$\times$s inclusive.

5. An inkjet recording apparatus comprising a recording head for discharging an ink containing a coloring material in a dissolved or dispersed state, an ink cartridge having an ink storage unit containing the ink, ink supply means for supplying the ink from the ink cartridge to the recording head, and means for supplying a reaction solution that destabilizes the dissolved or dispersed state of the coloring material in the ink after contact with the ink, wherein the reaction solution contains at least a polyvalent metal ion and a nonionic polymer, the Ka value of the reaction solution according to the Bristow method is from 1.3 mL$\times$m$^{-2}\times$msec$^{-1/2}$ to 3.0 mL$\times$m$^{-2}\times$msec$^{-1/2}$ inclusive, and the viscosity of the reaction solution is from 20 mPa$\times$s to 150 mPa$\times$s inclusive.

6. The inkjet recording apparatus according to claim 5, wherein the amount of the polyvalent metal ion is from 0.01% to 10% inclusive by weight based on the total amount of the reaction solution.

7. The inkjet recording apparatus according to claim 5, wherein the pH of the reaction solution is from 2 to 7 inclusive.

8. The inkjet recording apparatus according to claim 5, wherein the pH of the reaction solution is lower than that of the ink.

9. The inkjet recording apparatus according to claim 5, wherein the viscosity of the reaction solution is greater than that of the ink.

10. The inkjet recording apparatus according to claim 5, comprising a coating roller for applying the reaction solution onto a recording medium.

11. The inkjet recording apparatus according to claim 10, wherein the reaction solution is applied onto the recording medium in an amount from 0.5 g/m² to 10 g/m² inclusive.

12. An image recording method comprising the steps of:

coating a recording medium with a reaction solution capable of destabilizing the dissolved or dispersed state of a coloring material in an ink after contact with the ink containing the coloring material in a dissolved or dispersed state; and coating the ink on the recording medium by an inkjet method, wherein the reaction solution contains at least a polyvalent metal ion and a nonionic polymer, the Ka value of the reaction solution according to the Bristow method is from $1.3\ \text{mL} \times \text{m}^{-2} \times \text{msec}^{-1/2}$ to $3.0\ \text{mL} \times \text{m}^{-2} \times \text{msec}^{-1/2}$ inclusive, and the viscosity of the reaction solution is from 20 mPa×s to 150 mPa×s inclusive.

13. The image recording method according to claim 12, wherein the polyvalent metal ion is contained in an amount from 0.01% to 10% inclusive by weight based on the total amount of the reaction solution.

14. The image recording method according to claim 12, wherein the pH of the reaction solution is less than 7.

15. The image recording method according to claim 12, wherein the pH of the reaction solution is lower than that of the ink.

16. The image recording method according to claim 12, wherein the viscosity of the reaction solution is greater than that of the ink.

17. The image recording method according to claim 12, wherein coating of the reaction solution on the recording medium is carried out by a coating roller.

18. The image recording method according to claim 17, wherein the reaction solution is applied onto the recording medium in an amount from $0.5\ \text{g/m}^2$ to $10\ \text{g/m}^2$ inclusive.

* * * * *

UNITED STATES PATENT AND TRADEMARK OFFICE
CERTIFICATE OF CORRECTION

PATENT NO.         : 6,935,732 B2
APPLICATION NO. : 10/662282
DATED                 : August 30, 2005
INVENTOR(S)       : Yoichi Takada et al.

It is certified that error appears in the above-identified patent and that said Letters Patent is hereby corrected as shown below:

On Title Page
Item [56] References Cited

FOREIGN PATENT DOCUMENTS

"EP     0 739 743 A1   10/1996" should be deleted.

Column 4

Line 46, "No$_3^-$," should read --NO$_3^-$,--.

Column 7

Line 67, "increase" should read --increased--.

Column 8

Line 45, "boned" should read --bonded--.

Column 14

Line 40, "designate" should read --designates--.
    Line 59, "filter" (second occurrence) should be deleted.

Column 16

Line 27, "3 part" should read --3 parts--.

Signed and Sealed this

Nineteenth Day of December, 2006

JON W. DUDAS
*Director of the United States Patent and Trademark Office*